May 31, 1966 P. B. DAY ET AL 3,254,160

REGULATED GAIN TELEPHONE HANDSET RECEIVER AMPLIFIER

Filed Dec. 27, 1962

INVENTORS
PAUL B. DAY and
JOSEPH J. RADOMSKI
BY
William J. Ruano
their ATTORNEY

United States Patent Office 3,254,160
Patented May 31, 1966

3,254,160

REGULATED GAIN TELEPHONE HANDSET RECEIVER AMPLIFIER

Paul B. Day and Joseph J. Radomski, Reading, Pa., assignors to Gai-Tronics Corporation, Reading, Pa.

Filed Dec. 27, 1962, Ser. No. 247,586
3 Claims. (Cl. 179—81)

This invention relates to a telephone handset receiver and circuit and, more particularly, to a regulated gain telephone handset receiver amplifier and handset assembly.

An outstanding disadvantage of conventional or commonly used telephone receiver circuits is that the gain fluctuates with variations in telephone line current, giving variations in the level of amplification and inconsistent performance or reception of the receiver. Filters such as chokes and capacitors have been used to improve this situation but they have not provided a satisfactory solution to the problem.

Another disadvantage of conventional receiver amplifiers is poor frequency response and high distortion. When a telephone line is long, the line termination voltage and the line current are both low, resulting in a low gain, low power output, high distortion and poor frequency response. Actually, persons with impaired hearing require the maximum performance of the amplifier under this condition.

An object of the present invention is to provide a novel telephone receiver and amplifier circuit devoid of the above named disadvantages.

A more specific object of the invention is to provide a telephone handset amplifier having output and gain levels which remain substantially constant despite wide variations of telephone line conditions, such as variations in line currents.

A still more specific object of the invention is to provide a novel, regulated gain telephone handset receiver amplifier which is inserted into and becomes an integral part of the handset handle of a telephone with a protruding and readily accessible control knob, operated by the thumb or finger, for varying the level of the signal to the existing receiver element.

Figure 1:
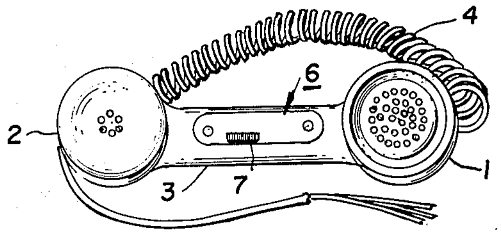
Figure 2:
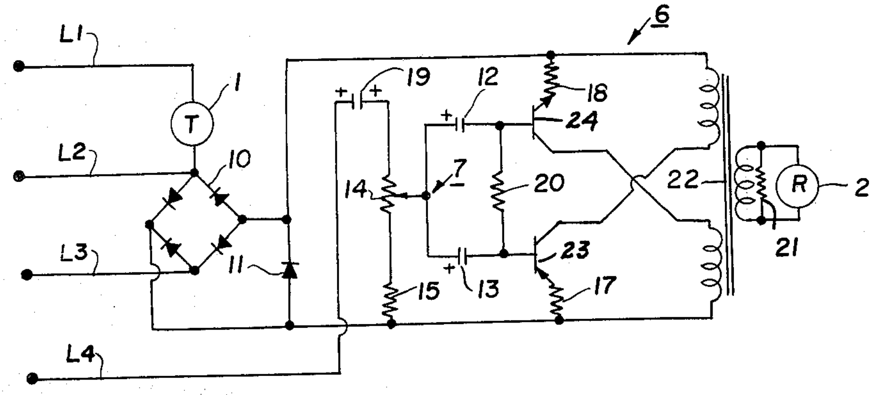

Other objects and advantages will become more apparent from a study of the following description taken with the accompanying drawing wherein:

FIG. 1 is a plan view of a telephone handset having enclosed therein a regulated gain amplifier embodying the present invention; and FIG. 2 is a circuit diagram of the receiver circuit and regulated gain amplifier.

Referring more particularly to FIG. 1 of the drawing, numeral 1 denotes a telephone transmitter and numeral 2 denotes a telephone receiver, mounted on the end portions of a handset handle 3 and which are connected to a telephone subset by flexible wire cord 4. Numeral 6 generally denotes a regulated gain amplifier embodying the present invention, which is inserted in and becomes an integral part of the handset handle 3, having only a protruding knurled control knob 7, turning of which varies the amplification factor of the amplifier.

FIG. 2 shows the novel circuit details of amplifier 6. Amplifier 6 is so designed as to provide, in a unique manner, a regulated gain. This feature, not found in conventional units, is extremely necessary to provide consistent performance regardless of the general variation in telephone line conditions. To accomplish this feature, D.C. power to operate the amplifier is obtained from the telephone line current flowing through the telephone to which the amplifier is connected. Part or all of the line current (dependent upon type of telephone) goes through the switching diodes 10 which properly orient the direction of the flow of direct current supplied to the amplifier and voltage regulating diode 11. Diode 11 has a reasonably constant forward voltage drop when passing low or high values of current derived from telephone lines. Diode 11 passes the balance of the current not passed by the amplifier proper.

Diodes 10 and 11 are of the high conductance type, for example, of germanium and silicon, respectively. Because the forward voltage drop of these diodes remains relatively constant while the line current is varying, the combined group of diodes may be considered to have a low A.C. impedance, similar to the impedance of a capacitor. For the overall application, the following results are accomplished using the regulator of the present invention:

(1) A closely regulated, low voltage D.C. supply is obtained for powering the amplifier.

(2) The amplifier D.C. supply is efficiently decoupled from all incoming and outgoing signals pertaining to the telephone to which it is electrically connected, without the use of filter chokes or capacitors.

(3) The regulated amplifier has little or no ill effect upon the operation of the transmitter when transmitting.

(4) As the result of the quality of regulation of the D.C. supply thus obtained, the variation in gain of the amplifier is essentially negligible throughout a wide variation of line current.

(5) Operational stability and uniformity of level of amplification is assured by this scheme of regulated gain.

*Amplifying section*

The amplifying section of the unit employs two transistors, 23 and 24, one NPN type and one PNP type. They are connected to the circuitry in a modified two transistor complementary symmetry circuit configuration, class AB. Push pull class "AB" is used rather than single-ended class "A" circuitry because of two striking advantages. (1) Class "A" demands a certain amount of direct current flow through the transformer of the output circuit, tending to saturate the core of this transformer, resulting in poor frequency response and high distortion. Push-pull circuitry tends to eliminate this problem. (2) With a given power supply it is possible to deliver more power output from a push-pull class "AB" circuit than can be delivered from a single-ended class "A" circuit. This difference is pronounced at low voltages and currents in transistor circuitry. Since the regulator portion of this device holds the D.C. voltage to a value near to that which may be encountered under the most adverse line current condition say, for example, sixtenth volt, the amplifier can be designed for optimum performance at this voltage and the performance will not suffer when line current conditions improve, as could be expected in the case of an amplifier having no regulator.

Another feature of the amplifier is the output transformer. The windings are simultaneously wound, therefore closely coupled, resulting in high efficiency, excellent frequency response and low distortion. In addition to this a transformer of this type can be reduced in physical size when compared with the conventional type transformers. Connection of the primary windings of the power output transformer 22 are such that magnetic fields caused by direct currents are cancelled. Alternating currents are in phase, together supply energy to the secondary winding which is connected to receiver element R, denoted by numeral 2. Frequency response of the amplifier is relatively flat through the range of frequencies concerned with this type of application. This is due in part to the unsaturated core of transformer 22, the result of cancelling the magnetic fields caused by direct currents in the primary windings. The transformer windings are tightly coupled, allowing maximum transfer of energy from primary windings to secondary windings, at the same time inherently keeping the collector signal currents through the transistors closely in phase with each other. This action tends to prevent the amplified signal presented to the receiver element from becoming distorted.

The modified complementary symmetry circuit eliminates the need for a driver transformer for the transistors. The driver transformer method is the normal arrangement which is generally used in low voltage amplifiers of the common emitter configuration.

*Safeguards telephone anti-sidetone circuit*

In order to assure good frequency response of the amplifier, the input impedance of the amplifier, measured at a point of junction of capacitors 12 and 13 with variable resistor 14 is many times higher than its source impedance, resistors 14 and 15. Degenerating resistors 17 and 18 are used to accomplish this and distortion is held to a minimum. It follows, then, that the setting of the movable arm 7 of resistor 14 which is the finger or thumb operated, knurled wheel volume control, will have little effect upon the actual input impedance of the total amplifier device measured at the points of the incoming receiver connections L3, L4. Resistors 14 and 15 are chosen, in total, to approximate the impedance of the receiver element which would normally connect to the incoming receiver connections L3, L4 of the telephone subset. By doing this, the intended operation of the anti-sidetone circuit of the telephone subset is maintained. The ratio of resistances 15 to 14 is such that when movable arm 7 of resistor 14 is at the junction of resistors 15 and 14, gain of the amplifier is zero decibels.

Capacitor 19 is used to block D.C. voltage developed across the regulator 11 and diode switch 10. Capacitors 12 and 13 block D.C. voltage developed across base biasing resistor 20, and also block D.C. voltage between resistors 20 and 14. Capacitors 19, 12 and 13 are of sufficient value to prevent attenuation of the lower frequencies concerned.

*Frequency response and range*

In order to create a flatter curve of response, or, in effect, a more constant level of frequency response, a loading resistor 21 is connected in the transformer 22, and is shown across the output to the receiver element denoted by numeral 2. This assures proper output of the higher frequencies. Attenuation of the low frequencies is prevented by capacitors 19, 12 and 13 as explained previously.

*Power output to receiver element*

The stability of the power output is demonstrated by the fact that the output capability remains essentially constant throughout a wide variation of line current, a result of the regulated D.C. supply. The amplifier is capable of driving the telephone receiver element to the necessary higher sound power output levels which are appreciably above those possible with the conventional telephone. The desired level of receiver output is, of course, readily adjusted with the listener's finger by moving the small protruding arm or knurled wheel 7 of resistor 14. The maximum sound power output is restricted to a value which is within the tolerable or maximum comfort zone.

Thus it will be seen that we have provided an efficient, small compact receiver amplifier which is connected electrically between the incoming receiver circuit and the receiver element and which fits into and becomes a part of the handle of a telephone substation together with a special regulating circuit which provides the proper power supply to assure regulated gain, using telephone line current; furthermore, we have greatly simplified the amplifying section to provide operation without the need of a transistor driver transformer and to provide for balancing of D.C. to the two primary windings of the output transformer, thereby neutralizing the D.C. field, moreover, D.C. supply is efficiently decoupled from signals, thus eliminating the need of filters, such as chokes and capacitors, resulting in better operation and no filter losses and with no effect on the transmitter or telephone anti-sidetone network; furthermore, we have provided a transformer designed to keep transistor collector currents closely in phase to avoid distortion and having tight coupling between the primary and secondary for maximum transfer of energy; also we have provided a receiver amplifier having essentially a constant level of response from low to high frequencies and demonstrated stability of the power output which results from essentially a constant level of amplification as set by the finger operated gain control.

While we have illustrated and described a single specific embodiment of our invention, it will be understood that this is by way of illustration only, and that various changes and modifications may be made within the contemplation of our invention and within the scope of the following claims.

We claim:

1. A telephone handset comprising a handle, a transmitter at one end and a receiver at the other end of said handle, an amplifier contained within said handle and connected between said transmitter and receiver, voltage regulating diode means of the high conductance type connected between said transmitter and amplifier, said amplifier being energized by a source of D.C. power obtained from the telephone line current, said amplifier having a substantially constant gain throughout a wide variation of line current and including a control element projecting outwardly of said handle for varying the volume level of the incoming signal to said receiver.

2. A telephone handset as recited in claim 1 wherein said amplifier includes two transistors, one NPN type and the other PNP type connected in complementary symmetry circuit configuration, class AB, a single resistor connected between said transistors so that the base currents flowing through both transistors is the same, and a power output transformer having a secondary winding connected to said receiver and primary windings directly connected to said transistors in a manner so that magnetic fields caused by direct currents are out-phased, therefore cancelled, and so that alternating currents are in phase, therefore supplying energy to said secondary winding and receiver, said transformer having an unsaturated core, whereby the frequency response of the amplifier is relatively flat through a wide range of frequencies.

3. A telephone handset as recited in claim 2 wherein the windings of said transformer are tightly coupled to allow maximum transfer of energy from the primary windings to the secondary winding and wherein the collector signal currents through the transistors are closely in phase with each other, thereby tending to prevent the amplified signal to the receiver from becoming distorted.

References Cited by the Examiner

UNITED STATES PATENTS

| | | | |
|---|---|---|---|
| 2,762,870 | 9/1956 | Sziklai et al. | 179—1 |
| 2,791,645 | 5/1957 | Bessey | 330—13 |
| 2,842,623 | 7/1958 | Lehr | 179—81 |
| 2,950,351 | 8/1960 | Leman | 179—81 |

ROBERT H. ROSE, *Primary Examiner.*

WALTER L. LYNDE, *Examiner.*

H. BOOHER, H. ZELLER, *Assistant Examiners.*